US010445625B2

(12) United States Patent
Condon et al.

(10) Patent No.: US 10,445,625 B2
(45) Date of Patent: Oct. 15, 2019

(54) METADATA TAGGING MECHANISM

(71) Applicants: John Barker Condon, Corvallis, OR (US); Reinhard Heinrich Hohensee, Boulder, CO (US); Harry Reese Lewis, Longmont, CO (US)

(72) Inventors: John Barker Condon, Corvallis, OR (US); Reinhard Heinrich Hohensee, Boulder, CO (US); Harry Reese Lewis, Longmont, CO (US)

(73) Assignee: Ricoh Company, Ltd., Tokyo (JP)

(*) Notice: Subject to any disclaimer, the term of this patent is extended or adjusted under 35 U.S.C. 154(b) by 77 days.

(21) Appl. No.: 15/051,032

(22) Filed: Feb. 23, 2016

(65) Prior Publication Data
US 2017/0083801 A1 Mar. 23, 2017

Related U.S. Application Data

(60) Provisional application No. 62/221,234, filed on Sep. 21, 2015.

(51) Int. Cl.
*G06K 15/02* (2006.01)
*G06F 3/12* (2006.01)
*G06F 17/21* (2006.01)
*G06F 17/22* (2006.01)
*G06F 17/00* (2019.01)

(52) U.S. Cl.
CPC ....... *G06K 15/1809* (2013.01); *G06F 3/1204* (2013.01); *G06F 3/1244* (2013.01); *G06F 3/1285* (2013.01); *G06F 17/211* (2013.01); *G06K 15/1852* (2013.01); *G06F 17/2247* (2013.01)

(58) Field of Classification Search
CPC .............. G06F 17/211; G06F 17/2247; G06F 17/30011; G06F 17/3089; G06F 17/30899; G06F 3/1205; G06Q 30/02; G06K 15/02
See application file for complete search history.

(56) References Cited

U.S. PATENT DOCUMENTS

| | | | |
|---|---|---|---|
| 7,756,865 B2 | 7/2010 | Condon et al. | |
| 2007/0156726 A1* | 7/2007 | Levy | G06F 17/3002 |
| 2008/0037047 A1* | 2/2008 | Condon | G06F 17/211 358/1.13 |
| 2014/0085649 A1* | 3/2014 | Hohensee | G06F 3/1205 358/1.13 |
| 2015/0220285 A1 | 8/2015 | Hohensee et al. | |

OTHER PUBLICATIONS

Andreassen, K., AFPC Update, AFPC Consortium, May 2015, 10 pages.
Steinmetz, R., & Nahrstedt, K., Documents, Hypertext, and Hypermedia, 2004, pp. 87-132.

* cited by examiner

*Primary Examiner* — Quoc A Tran
(74) *Attorney, Agent, or Firm* — Jaffery Watson Mendonsa & Hamilton LLP

(57) ABSTRACT

A method is disclosed. The method includes detecting an object within Advanced Presentation Document (AFP) print data and inserting a Metadata Object Content Architecture 2.0 (MOCA-2) object into the AFP print data to associate contextual information with a component of data within the object.

20 Claims, 5 Drawing Sheets

```
BPT
  OEG
    MOCA-2
310 ──► LIDx45: metadata=hyperlink, target=www.cruisevacation.com
        Other information for link (such as highlight color, underscore)
    ......
    PTX
    ....
320 ──► BMT, LIDx45
        TRN, "escape"
        EMT
    ....
EPT
```

Figure 3

```
BPT
  OEG
    MOCA-2
410 ──► LIDx50: metadata=executable, type=HTML, level=2
        HTML Source begin
          <!DOCTYPE html>
          <html>
          <body>
           <h1>Cruising is fun</h1>
           <p>Let me tell you why...</p>
          <body>
          </html>
        HTML Source end
    ......
    PTX
    ....
420 ──► BMT, LIDx50
        TRN, "Cruise vacations"
        EMT
    ....
EPT
```

Figure 4

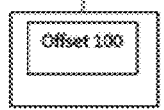

```
BPT
  OEG
   MOCA-2
     Type=Link, Target=www.cruisevacation.com, Offset=100, Extent=12
     Type=Audio, Target=CruiseShipHorn.wav, Offset=100, Extent=12

PTX
    other text ... "how would you like to escape?"
  EPT                              ┌──────────────┐
                                   │  Offset 100  │
                                   └──────────────┘
```

Figure 5

```
BIM (Begin Image Object)
  OEG (Object Environment)
   MOCA-2 (Metadata Container)
      metadata=hyperlink, target=www.cruisevacation.com, offset(x1,y1), size (xa,ya),
      metadata=audio, target=CruiseShipHorn.wav, offset (x2,y2), size (xc,yc)

IPD (Image Content)
```

Figure 6

METADATA TAGGING MECHANISM

This is a non provisional application based on provisional application Ser. No. 62/221,234 filed on Sep. 21, 2015 and claims priority therefrom.

FIELD OF THE INVENTION

The present invention relates to the field of document file format, printing, and in particular, to Advanced Function Presentation data.

BACKGROUND

Advanced Function Presentation (AFP) is a format used to store document data for print jobs, archival and other forms of presentation such as viewing. According to AFP standards, a print job is divided into AFP objects. Each AFP object may define a part of the print job, such as a document, a page, an image, text, etc. Further, AFP objects may be nested within each other. For example, an AFP document object may include multiple AFP page objects, and each AFP page object may include multiple text and/or graphical objects.

Each AFP print job may be associated with metadata. Metadata is contextual information used to describe the print job. For example, metadata may indicate an author of the print job, may indicate a preferred rasterization algorithm to use while processing the print job, or may indicate any other suitable characteristic of the print job. As presently required according to AFP standards, metadata for an AFP print job is stored within an index as a series of one or more AFP-defined Index Elements (IELs). Each IEL includes Tagged Logical Elements (TLEs), which each contain a single name-value attribute pair. A more robust form would include metadata represented in XML format or metadata objects which, themselves, may contain alternate representations for the object such as annotation, audio, video, java script and the like. Association of such rich metadata has recently been enabled for the AFP Print File (MOCA-1) as well as at the AFP Object level (MOCA-2).

However, a problem with the above-described method is that in order to associate metadata with individual components (e.g., a word or text phrase) within a page, the page must be separated into multiple text objects. This results in fragmentation of an otherwise well-composed page. This fragmentation can lead to workflow challenges when merging or modifying content and performance issues in the final rendering (e.g. printing).

Accordingly, an efficient metadata tagging mechanism which does not disrupt the intended document taxonomy is desired.

SUMMARY

In one embodiment, a method is disclosed. The method includes detecting an object within Advanced Presentation Document (AFP) print data and inserting a Metadata Object Content Architecture 2.0 (MOCA-2) object into the AFP print data to associate contextual information with one or more data components (e.g. text strings) within the object (e.g. page).

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

FIG. 3 illustrates one embodiment of code implemented to perform a local ID tagging process;

FIG. 4 illustrates another embodiment of code implemented to perform a local ID tagging process;

FIG. 5 illustrates one embodiment of code implemented to perform a byte offset tagging process;

FIG. 6 illustrates one embodiment of code implemented to perform an area coordinate tagging process;

DETAILED DESCRIPTION OF THE INVENTION

A mechanism for efficient metadata tagging is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
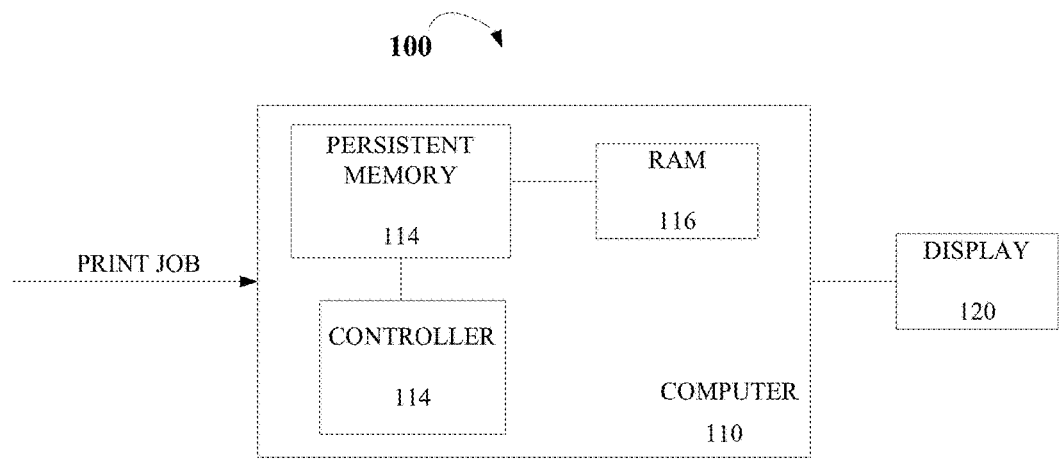
FIG. 1 is a block diagram illustrating one embodiment of a computer system.

FIG. 1 illustrates one embodiment of a computer system 100. Computer system 100 may be used by a print shop operator to generate and/or process indices for AFP print jobs. A document generation application (or alternatively a print shop operator) may generate an index for a print job in order to store metadata for the print job. For example, consider a print job that will be delivered to people who speak different languages. In such cases, the print job may be printed and physically delivered in one language, while the metadata may be sent with an electronic version of the job in order to describe objects within the print job in another language. System 100 comprises any system, device, or component operable to generate and/or process indices for AFP print data, such as a computer, a server, a network, etc.

In one embodiment, system 100 has been enhanced to utilize Metadata Object Content Architecture 2.0 (MOCA-2) to insert contextual information or metadata into the AFP Mixed Object Document Context Architecture (MO:DCA). As used herein, the terms "contextual information" or "metadata" refer to information that describes or is otherwise associated with an AFP object.

In this embodiment, system 100 comprises controller 112, persistent memory 114, and Random Access Memory (RAM) 116. Controller 112 manages the operations of computer 110, and may be implemented, for example, as custom circuitry or as a processor executing programmed instructions. Controller 112 may use persistent memory 114

(e.g., a disk drive) to store print data and/or indices for later retrieval. Controller 112 may use RAM 116 in order to actively load and process portions of AFP print data kept in persistent memory 114. Furthermore, controller 112 may utilize display 120 (e.g., a monitor, screen, etc.) in order to visually show indices or portions of print data to a user. Additional devices, such as audio devices or multimedia devices (e.g., televisions, etc.) may be used to provide information as desired. The particular arrangement, number, and configuration of components described herein is exemplary and non-limiting.

Figure 2:
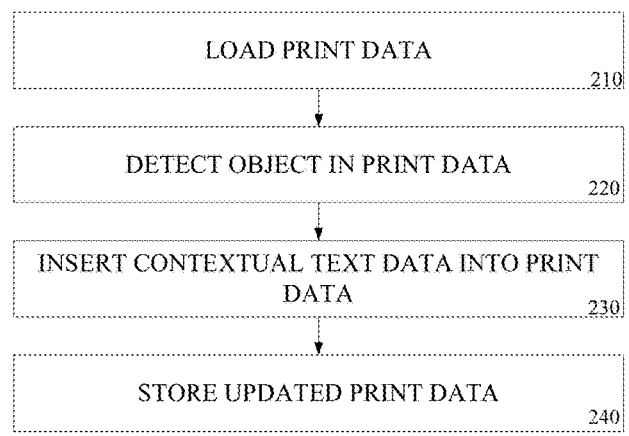
FIG. 2 is a flow diagram illustrating one embodiment of inserting metadata.

FIG. 2 is a flow diagram illustrating one embodiment of inserting metadata into AFP print data. The process of FIG. 2 is described with reference to computer system 100. However embodiments may be implemented in other systems. The steps of the flowcharts described herein are not all inclusive and may include other steps not shown. The steps described herein may also be performed in an alternative order.

At processing block 210, controller 112 loads AFP print data from persistent memory 114 into RAM 116. At processing block 220, AFP object (e.g., an Object Container Data (OCD) structured field) is detected within the AFP print data. In one embodiment, the object is a text object indicating presentation of a page of text data. However in other embodiments the object may be another type of presentation object, such as an image object. At processing block 230, contextual information (or metadata) is inserted into the AFP print data that corresponds to the object. As discussed above, the contextual data is inserted into the print data via a MOCA-2 container.

In one embodiment, insertion of the contextual data includes also inserting a reference to the component within the object (e.g., a string of text, coordinates of an image) to which the contextual data is to be associated. For example, the contextual data may be a Uniform Resource Locator (URL) that is associated with each occurrence of a text string (e.g., word, phrase or sentence) within a text object, or at a specific coordinate of an image.

In one embodiment, multiple metadata objects may be associated with different text data within the same object. In such an embodiment, a first set of one or more metadata objects may be associated with a first text string of text within a text object, while a second set of one or more metadata objects may be associated with a second text string of text within the text object. At processing block 240, the updated print data is stored in memory 214. At some time later, during processing of the update AFP print data, the print data is presented with the inserted contextual data.

According to one embodiment, the structured begin/end object syntax in MO:DCA is implemented to embed tags associated with a local identifier (LID) that links back to the metadata or contextual data in a MOCA-2 container. In such an embodiment, a new structure referred to as Begin Metadata Tag (BMT) is defined. FIG. 3 illustrates one embodiment of such a local ID tagging implementation.

As shown in FIG. 3, a metadata target (e.g., www.cruisevacation.com) is inserted into the print data using the LIDx45 instruction 310. Subsequently, the corresponding text is inserted into the print data via the BMT structured field 320, and a transparent data instruction linking the word "escape". Thus during subsequent execution of the document data, a URL for www.cruisevacation.com is activated upon selection of the word "escape" on the page.

In other embodiments, the LID tagging process can be used with metadata objects that define inline executable function. Such an embodiment enables the display of Hyper-Text Markup Language (HTML) without having to reference a URL. In other embodiments, Javascript or Ajax script may be implemented. FIG. 4 illustrates another embodiment of a local ID tagging process in which an inline executable function is implemented rather than a URL.

In this embodiment, an HTML executable is inserted into the print data using the LIDx50 instruction 410, along with the HTML code. Subsequently, the corresponding text is inserted into the print data via the BMT structured field 420 with a transparent data instruction linking the word "Cruise vacations". Similarly, during subsequent execution of the print data, the HTML executable is executed upon user selection of any occurrence of "Cruise vacations".

In an alternative embodiment, metadata may be added using a MOCA-2 container by indexing one or more links (e.g., URLs) within the metadata using a byte displacement (e.g., offset, extent) into the associated object (e.g., text). For instance, the byte offset may point to a particular code point at a byte offset in a large (e.g., two million byte) print file.

FIG. 5 illustrates one embodiment of a byte offset tagging implementation. As shown in FIG. 5, hyperlink and audio contextual data is included in the MOCA-2 container along with a byte offset and an extent. Subsequently, the offset is linked with the word "escape". Accordingly, during subsequent execution of the document data, a URL for www.cruisevacation.com, as well as audio (e.g., CruiseShipHorn.wav), is activated, upon selection of the word "escape" on the page.

In yet another embodiment, metadata may be added using the MOCA-2 container by supplying coordinates within the page (or object area) at which the contextual information is to be associated. In this embodiment, one or more contextual data objects may be tagged within an image object. FIG. 6 illustrates one embodiment of such an area coordinate tagging implementation in which hyperlink and audio contextual data is included in the MOCA-2 container along with offset and size coordinates.

Figure 7:
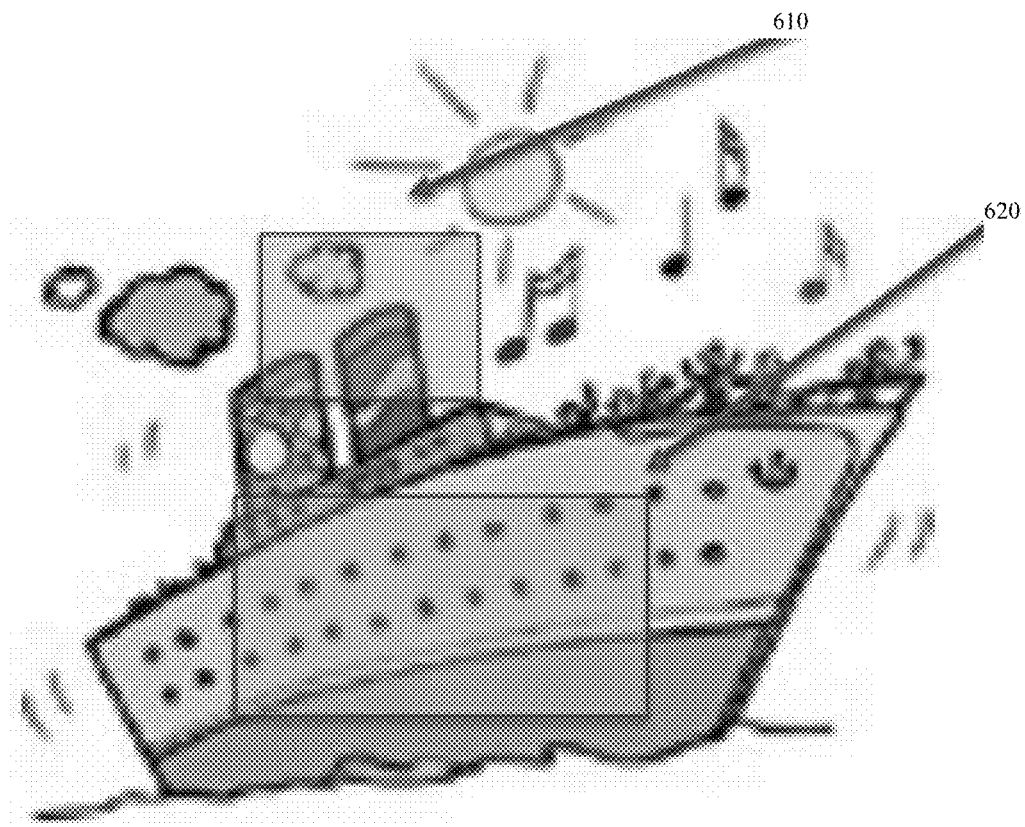
FIG. 7 illustrates one embodiment of contextual information added to an image.

FIG. 7 illustrates one embodiment of contextual information added to an image of a cruise ship upon execution of the document file. In such an embodiment, the coordinates 610 and 620 include user selectable (or clickable) areas on the image to which the contextual information is associated. For example, coordinate 610 is associated with the audio metadata such that the audio file CruiseShipHorn.wav is played upon coordinate 610 being clicked by a user. Similarly, coordinate 620 is associated with the www.cruisevacation.com URL, which is activated upon coordinate 620 being clicked by a user.

Figure 8:
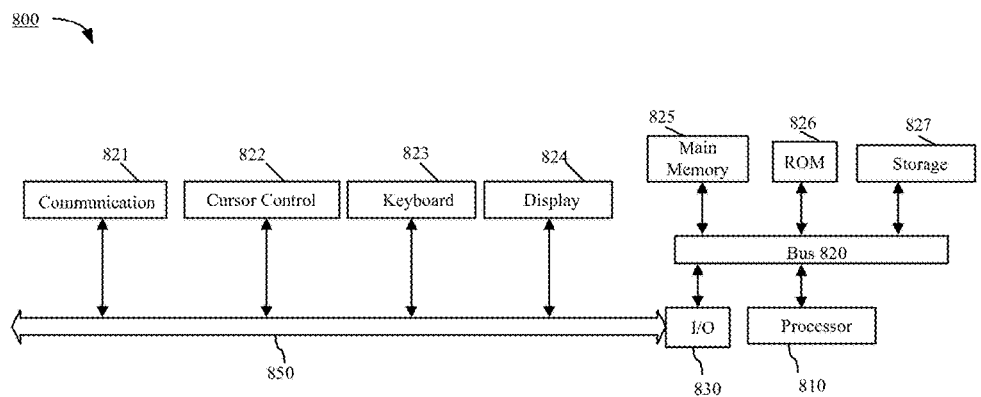
FIG. 8 illustrates one embodiment of a computer system.

FIG. 8 illustrates a computer system 800, representing a full system at which computer system 100 may be implemented. Computer system 800 includes a system bus 520 for communicating information, and a processor 810 coupled to bus 820 for processing information. According to one embodiment, processor 810 is implemented using one of multitudes of microprocessors. Nevertheless one of ordinary skill in the art will appreciate that other processors may be used.

Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 825 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., an alphanumeric input device 823 and or a cursor control device 822). The communication device 821 is for accessing other computers (servers or clients) via an external data network, for example. The communication device 821 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed:

1. A non-transitory machine-readable medium having instructions, which when executed by a machine, causes the machine to:
   receive Advanced Presentation Document print data;
   process the print data, including:
      detecting a document object within the print data; and
      inserting a Metadata Object Content Architecture 2.0 (MOCA-2) object into the print data to associate contextual information with a component of data within the document object, wherein the contextual information provides a description of the component of data; and
   transmit the print data for presentation, wherein the component of data is to be presented according to the description provided by the contextual information included in the MOCA-2 object.

2. The machine-readable medium of claim 1, having instructions, which when executed by a machine, further causes the machine to insert a second MOCA-2 object into the print data to associate second contextual information with a second component of data of data within the document object, wherein the second component of data is to be presented according to a description provided by the second contextual information included in the second MOCA-2 object.

3. The machine-readable medium of claim 2, wherein inserting a MOCA-2 object comprises:
   inserting the contextual information; and
   inserting a reference to the component of data to which the contextual information is associated.

4. The machine-readable medium of claim 3, wherein inserting the contextual information comprises:
   inserting a local identifier within the component of data; and
   associating the contextual information with the local identifier.

5. The machine-readable medium of claim 4, wherein inserting the component of data to which the contextual information is associated comprises:
   inserting a Begin Metadata Tag structure to the component of data; and
   defining the contextual information to which the Begin Metadata Tag structure is associated.

6. The machine-readable medium of claim 3, wherein inserting the contextual information comprises associating a displacement into data within the object.

7. The machine-readable medium of claim 6, wherein the displacement comprises a byte offset and an extent.

8. The machine-readable medium of claim 3, wherein the contextual information comprises a Uniform Resource Locator (URL) associated with the string of data.

9. The machine-readable medium of claim 3, wherein the contextual information comprises an inline executable function associated with the string of data.

10. The machine-readable medium of claim 3, wherein the contextual information comprises audio.

11. The machine-readable medium of claim 2, wherein inserting a MOCA-2 object comprises:
    inserting the contextual information; and
    inserting coordinates within an area of the document object at which the contextual information is associated.

12. The machine-readable medium of claim 11, wherein the coordinates comprise a coordinate offset and size.

13. A system comprising:
    a storage device to store the print data; and
    a controller to process the print data, including detecting a document object within the print data and inserting a Metadata Object Content Architecture 2.0 (MOCA-2) object into the print data to associate contextual information with a component of data within document the object and transmit the print data for presentation, wherein the component of data is to be presented according to a description provided by the contextual information included in the MOCA-2 object.

14. The system of claim 13, wherein the controller further inserts a second MOCA-2 object into the print data to associate second contextual information with a second component of data within the document object, wherein the second component of data is to be presented according to a description provided by the second contextual information included in the second MOCA-2 object.

15. The system of claim 14, wherein inserting a MOCA-2 object comprises inserting the contextual information and inserting the component of data to which the contextual information is associated.

16. The system of claim 15, wherein inserting the contextual information comprises inserting a local identifier within the component of data and associating the contextual information with the local identifier.

17. The system of claim 16, wherein inserting the component of data to which the contextual information is associated comprises inserting a Begin Metadata Tag structure to the component of data; and defining the contextual information to which the Begin Metadata Tag structure is associated.

18. The system of claim 14, wherein inserting the contextual information comprises associating a displacement into data within the object.

19. The system of claim 18, wherein the displacement comprises a byte offset and an extent.

20. The system of claim 14, wherein inserting a MOCA-2 object comprises inserting the contextual information and inserting coordinates within an area of the document object at which the contextual information is associated.

\* \* \* \* \*